US006272507B1

United States Patent
Pirolli et al.

(10) Patent No.: US 6,272,507 B1
(45) Date of Patent: Aug. 7, 2001

(54) SYSTEM FOR RANKING SEARCH RESULTS FROM A COLLECTION OF DOCUMENTS USING SPREADING ACTIVATION TECHNIQUES

(75) Inventors: Peter L. Pirolli, San Francisco; James E. Pitkow; Bernardo A. Huberman, both of Palo Alto, all of CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/163,595

(22) Filed: Sep. 29, 1998

Related U.S. Application Data

(63) Continuation-in-part of application No. 09/053,616, filed on Apr. 1, 1998, now Pat. No. 6,115,718, and a continuation-in-part of application No. 08/831,807, filed on Apr. 9, 1997, now Pat. No. 5,835,905.

(51) Int. Cl.[7] .................................................. G06F 15/00
(52) U.S. Cl. ............................ 707/513; 707/5; 707/501; 707/529; 707/514
(58) Field of Search .............................. 707/5, 513, 501, 707/514, 529; 345/968

(56) References Cited

U.S. PATENT DOCUMENTS

| | | | |
|---|---|---|---|
| 5,418,948 | 5/1995 | Turtle | 395/600 |
| 5,668,988 | 9/1997 | Chen et al. | 395/612 |
| 5,754,939 | * 5/1998 | Herz | 445/4.2 |
| 6,028,601 | * 2/2000 | Machiraju | 345/336 |
| 6,038,560 | * 3/2000 | Wical | 707/5 |
| 6,038,574 | * 3/2000 | Pitkow | 707/513 |
| 6,067,552 | * 5/2000 | Yu | 707/501 |
| 6,078,916 | * 6/2000 | Culliss | 707/5 |
| 6,098,064 | * 8/2000 | Pirolli | 707/2 |

OTHER PUBLICATIONS

Savoy, j., "A new problaistic scheme for information retrieval in hypertext" New review for Hypermedia and Multimedia, vol. 1 pp. 107–134, 1995.*

Mendelzon et al., "Querying the World Wide Web", Proceedings of the 4th International Conference on Parallel and Distributed Information Systems; Dec. 18–20, 1996, Miami Beach, Florida, pp. 80–91.

Savoy, J., "Searching information in hypertext systems using multiple sources of evidence", *Int'l. J. Man–Machine Studies* (1993) 38, pp. 1017–1030.

* cited by examiner

*Primary Examiner*—John Breene
*Assistant Examiner*—David J Robinson
(74) *Attorney, Agent, or Firm*—Richard B. Domingo

(57) ABSTRACT

A system and method for ranking the results of a search on a collection of linked documents. Documents found on the Web are typically referred to as Web pages. The system utilizes various information relating to the collection of linked documents, including the topology, content and historical usage of the linked collections of documents. The ranking is based on historical patterns and information about the current context of interest (e.g. what the user or group seems to be currently interested in doing). A spreading activation technique is used to identify the frequency of activation of the documents in the search results. Spreading activation techniques are based on representations of Web pages as nodes in graph networks representing usage, content, and hypertext relations among Web pages. After performing the spreading activation based on an initial set defined by the search results, each document from the results may be ranked based on their level of activation.

9 Claims, 8 Drawing Sheets

|  | Pages | | | | | | |
|---|---|---|---|---|---|---|---|
|  | 301 | 302 | 303 | 304 | 305 | 306 | 307 |
| 301 | 0 | 20 | 0 | 0 | 0 | 0 | 0 |
| 302 | 0 | 0 | 0 | 0 | 10 | 15 | 0 |
| 303 | 0 | 0 | 0 | 0 | 0 | 0 | 0 |
| 304 | 0 | 0 | 0 | 0 | 0 | 0 | 0 |
| 305 | 0 | 0 | 0 | 0 | 0 | 0 | 0 |
| 306 | 0 | 0 | 0 | 0 | 0 | 0 | 7 |
| 307 | 0 | 0 | 0 | 0 | 0 | 0 | 0 |

(Pages labels along left side)

FIG. 4

705   702   The search is over...

703 82% Las Vegas: InterMind.net : Las Vegas - This city is constantly growing and changing to keep attracting record breaking numbers of visitors each year. Las Vegas is not only good at promoting gaming but it has achieved excellence in customer service.
http://www.intermind.net/im/lasvegas.html
Search for more documents like this one
704

81% A Gamblers Edge - Also available at this website are the finest gambling systems anywhere to beat the casinos, real or virtual. Craps, unlike all other casino games, offers its players a true even money bet.
http://www.fastlane.net/homepages/jgurkin/gamble.htm
Search for more documents like this one 81% PCAP - If you have a Las Vegas business catering to the tourism industry or are a tour or travel company outside of Las Vegas specializing in trips or packages to Las Vegas, contact us for an absolutely free listing on our pages. Also if you are a tour company outside of the Las Vegas area with travel packages for Las Vegas bound customers the Las Vegas Leisure Guide would be the ideal place to.
http://www.pcap.com/pcap.htm
Search for more documents like this one

701

81% ! Las vegas ! The Big Las vegas Story ! with your host, the Las vegas M... - Far, away in a land where houses shaped like and mushrooms, live 100 tiny blue people called Las vegas. Some scholars think that Las vegas dropped out of mushrooms, while others are sure they just Las vegas ed out of nowhere. Suffice to say that all by themselves the Las vegas built a wonderous village deep in the forest run on happiness, or as they call it " Las vegas iness.
http://www.coastalbanks.com/fiveofdiamonds98iu.html
Search for more documents like this one 80% Las Vegas: Casino Gambling - Aspen's Las Vegas Casino Guide - Thank you for your interest in Las Vegas the vacation spot of choice for Conventions, and gambling Casinos! Gambling is of course legal in Nevada, in Las Vegas proper there are many places to gamble.
http://www.lvindex.com/vegas/gambling.htm
Search for more document like this one

| Next Results | Order by text | Previous results | 707
| 708 | 709 | 708 |

SYSTEM FOR RANKING SEARCH RESULTS FROM A COLLECTION OF DOCUMENTS USING SPREADING ACTIVATION TECHNIQUES

This application is a continuation-in-part of application Ser. No. 08/831,807 filed Apr. 9, 1997, now U.S. Pat. No. 5,835,905 and Ser. No. 09/053,616, filed Apr. 1, 1998, now U.S. Pat. No. 6,115,718.

FIELD OF THE INVENTION

The present invention is related to the field of analysis and design of linked collections of documents, and in particular to ranking the results of a search for documents in a linked collection of documents.

BACKGROUND OF THE INVENTION

Users of large linked collections of documents, for instance as found on the World Wide Web ("the Web"), are motivated to improve the rate at which they gain information needed to accomplish their goals. Hypertext structures such as those found on the Web primarily afford information seeking by the sluggish process of browsing from one document to another along hypertext links. This sluggishness can be partly attributed to three sources of inefficiency in the basic process. First, basic hypertext browsing entails slow sequential search by a user through a document collection. Second, important information about the kinds of documents and content contained in the total collection cannot be immediately and simultaneously obtained by the user in order to assess the global nature of the collection or to aid in decisions about what documents to pursue. Third, the order of encounter with documents in basic browsing is not optimized to satisfy users' information needs. In addition to exacerbating difficulties in simple information seeking, these problems may also be found in the production and maintenance of large hypertext collections.

Making sense of very large collections of linked documents and foraging for information in such environments is difficult without specialized aids. As noted above, collections of linked documents are often connected together using hypertext links. The basic structure of linked hypertext is designed to promote the process of browsing from one document to another along hypertext links, which is unfortunately very slow and inefficient when hypertext collections become very large and heterogeneous. Two sorts of aids have evolved in such situations. The first are structures or tools that abstract and cluster information in some form of classification system. Examples of such would be library card catalogs and the Yahoo!® Web site (URL: www.yahoo.com).

The second type of systems are those that attempt to predict the information relevant to a user's needs and to order the presentation of information accordingly. Examples would include search engines such as those found on the Yahoo Web site, Lycos (URL: www.lycos.com), InfoSeek (URL: www.infoseek.com), Excite (URL: www.excite.com) and Alta Vista (URL: www.altavista.com). In each of these systems a user's search request (i.e. information need), typically in the form of words and phrases, is processed and ordered lists of documents or information that are predicted to be relevant to the user's search request are presented.

The presentation of search results from Yahoo, Excite, Lycos and InfoSeek is by some classification, e.g. by the web site containing the information. However, Excite and Lycos permit alternate specifications for ranking and ordering documents. Generally, these tools "order and rank" the search based on their similarity to the user's topical query, which may include frequency of the terms of the search within the documents, where the term occurred (e.g. in title or body of document) or the proximity of the search terms to each other.

However, the aforementioned techniques for presenting the search results may not be optimal for many situations. For example, it may be desirable to order search results based on the documents frequency of access or based on a historical context of interest. The present invention addresses such a need.

SUMMARY OF THE INVENTION

A system and method for ranking the results of a search on a collection of linked documents, such as those found on the World Wide Web (hereinafter the Web) is disclosed. Documents found on the Web are typically referred to as Web pages. The system utilizes various kinds of information relating to the collection of linked documents, such as the topology, content and historical usage of the linked collections of documents to create the ranking. The ranking is based on historical patterns and information about the current context of interest (e.g. what the user or group appears to be currently interested in doing).

The present invention utilizes a spreading activation technique to identify the activation of the web pages identified in the search results. Spreading activation techniques are based on representations of Web pages as nodes in graph networks representing, for example, usage, content, and hypertext relations among Web pages. Activation is pumped into one or more of the graph networks at nodes representing the web pages/documents identified in the search result and it flows through the arcs of the graph structure, with the amount of flow modulated by the arc strengths (which might also be thought of as arc flow capacities) and a probability function which indicates the likelihood a user will continue to traverse through links in the document collection. The asymptotic pattern of activation over nodes will define the degree of activation of Web pages to the starting set of Web pages. The degree of activation will provide a measure by which to rank the search results.

The present invention is practiced by performing the steps of: gathering historical usage data for said collection of linked documents; providing said search results as initial activation information, said initial activation information indicating a set of focus documents in said collection of linked documents; generating page to page transition information from said usage data, said page to page transition information indicating a strength of association between documents in said collection of linked documents; generating link probability information from said historical usage data and topology and content data, said link probability information indicating a distribution of the number of documents a user will access in said collection of linked documents; performing a spreading activation operation based on said initial activation information, page to page transition information and said link probability information based on a network representation of said collection of linked documents; extracting said ranking information resulting from said spreading activation step when a stable pattern of activation across all nodes of said network representation of said collection of linked documents is reached; and ranking said search results based on said ranking information, said ranking based on the level of activation achieved.

BRIEF DESCRIPTION OF THE DRAWINGS

FIGS. 3–4 are diagrams showing a representation of a network as may be utilized by the spreading activation of the currently preferred embodiment of the present invention.

FIG. 7 is an illustration of a user interface through which a user may use the currently preferred embodiment of the present invention.

DETAILED DESCRIPTION OF THE INVENTION

Figure 1:
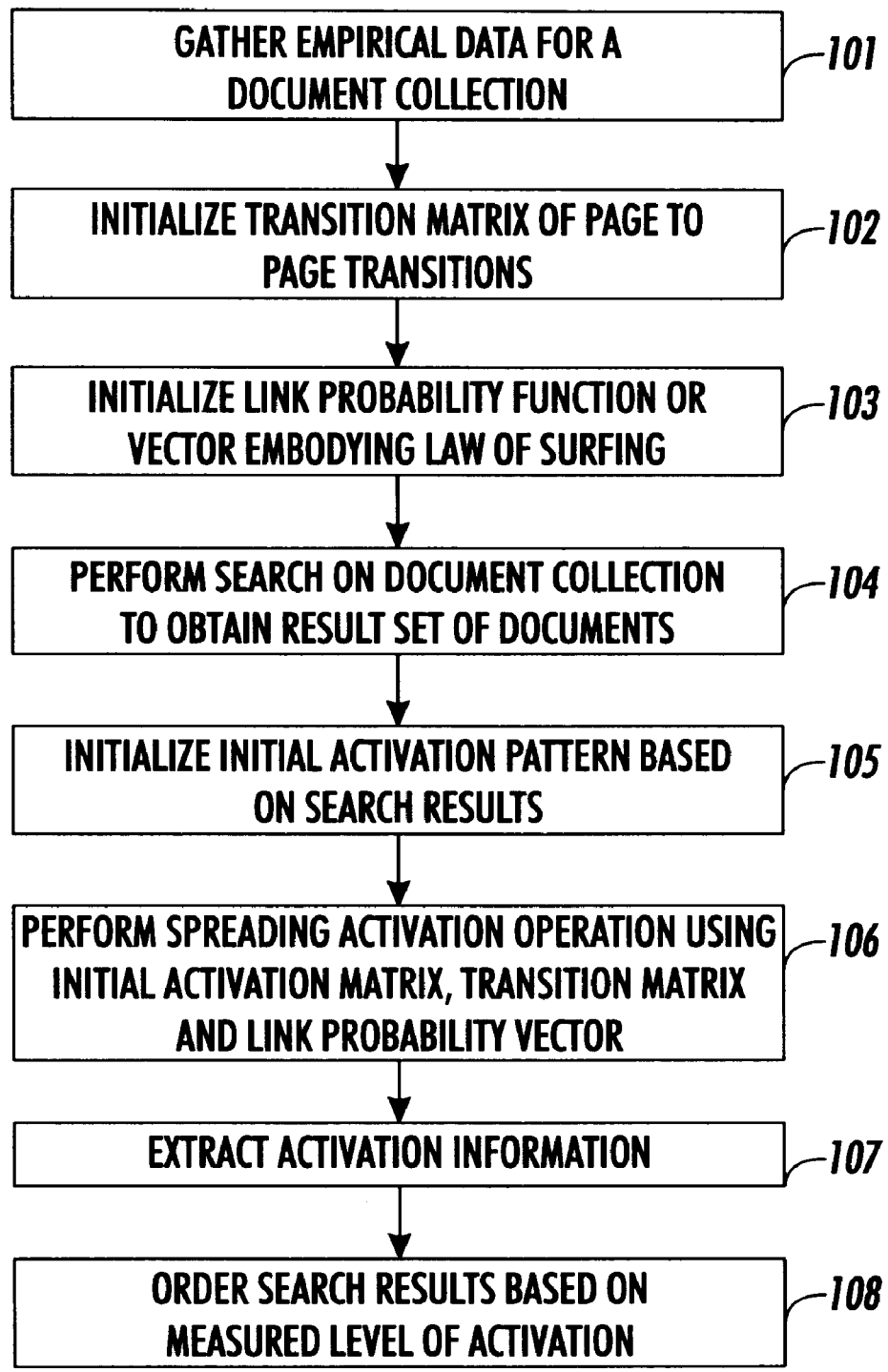
FIG. 1 is a flowchart illustrating the basic steps for determining a search result ordering, as may be performed in the currently preferred embodiment of the present invention.

A system for ranking the results of a search for documents from a collection of linked documents is disclosed. The ranking is based on historical patterns and information about a current context of interest of a user or group.

The currently preferred embodiment of the present invention is implemented for ranking the resulting set of documents obtained through a search of a collection of linked documents residing on the portion of the Internet known as the World Wide Web (hereinafter the Web). However, it should be noted that the present invention is not limited to use on the Web and may be utilized in any system which provides access to linked entities, including documents, images, videos, audio, etc. Further, in this description, the term Web page is an instance of a linked document and the two terms may be used interchangeably.

It has been observed that a collection of Web pages has a topology that is defined by links contained in the individual Web pages. Links are an indicator on a Web page which refers to another Web page and which can typically be retrieved in a point and click fashion. The link will specify the address, i.e. Uniform Resource Locator or URL, of the other Web page. On the Web the URL is commonly specified using the HyperText Transport Protocol (HTTP).

The present invention is motivated by the need to assist users in finding information on the World Wide Web. As the amount of information accessible on the Web continues to grow, much of it becomes out dated and redundant. It would be useful to be able to sort and rank search results based on measurements other than the similarity of web pages to the query or by the classifications provided. In particular, it has been determined through observation that it would be useful to order the presentation of search results using a historical and context based perspective.

For example, a user may want a ranking based on the most recently accessed documents. This would assist the searcher in determining if the information is "stale". This would be desirable if the information being sought has a limited "useful life", e.g. legal information or other information which may frequently change.

The ranking of the Search Result provides valuable information to the user. The user may rely on the ranking of the search results to determine which documents should be viewed first. Or the user may use the ranking to exclude documents from being viewed.

One aspect of the present invention provides a way in which search results may be ordered, other than by category or by similarity to the user's text query. Also it should be noted that the present invention can be used in combination with techniques for ordering search results based on text similarity with the user query.

Another use of the present invention may be to remove infrequently used documents from a document collection. For example, suppose it is determined that a document collection contains too many documents relating to a particular subject. This can be done by performing a search on the subject and determining that the number of documents in the search results exceeds some threshold. Anyway, the present invention can then be used to order the search results based on frequency of access. The least frequently accessed documents may then be removed from the document collection.

Overview of the Search Result Ranking Technique of the Currently Preferred Embodiment The flowchart of FIG. 1 describes the general steps for performing the steps of the present invention wherein the user desires that the search result be ordered to take into account the historical usage of the document collection and a user or group context. It should be noted that the steps need not necessarily be carried out in the order described. For example, the initial data gathering and matrix generation steps could be performed independently and updated on a periodic basis. The generated matrices could be applied to any search on the document collection. It should also be noted that different matrices representing different attributes of the document collection, may be used. The matrices used would depend on the different characteristics desired for the ordering. Co-pending application Ser. No. 08/831,807 describes how different matrices can be used to obtain different characteristics.

In any event, first, empirical data relating to the document collection is gathered, step 101. The empirical data may typically reside on usage records for the particular document collection (e.g. derived from Web Site usage records), or may be generated through analysis of the documents in the document collection (e.g. determining content similarity or link topology).

Next, a matrix of page to page transitions S is initialized, step 102. This is typically a usage-based matrix. The entries in the matrix indicate the proportion of users viewing a page that go from a particular page to another linked page.

Next, a probability function or vector is initialized embodying the law of surfing, step 103. The law of surfing is based on observations of raw data concerning usage of a document collection. The law of surfing provides an indication of the proportion of people who have produced L-1 clicks who then make another Lth click (i.e., the people who have not left after L-1 clicks).

A search is then performed on the document collection and a search result set of documents is obtained, step 104. This search may be performed by using a search engine capable of performing searches on the document collection. Such a search engine may be the aforementioned Excite or Lycos systems. Next, an initial activation pattern N(0) based on the search results is initialized, step 105. Generally, the initial activation patterns indicate a focus set of web pages corresponding to the actual, hypothetical, or predicted initial information interests of one or more users. As indicated, in the currently preferred embodiment, the initial activation pattern represents the documents/web pages contained in the search results.

Spreading activation is then performed using a suitable spreading activation technique, step 106. The spreading activation utilizes the above generated initial activation matrix, transition matrix and probability function. Activation information relating to the documents in the search result is extracted when a stable pattern of activation across all nodes (i.e. web pages) is settled into, step 107. The search results may then be ordered according to the measured level of activation, step 108.

Each of the steps are now described in greater detail.

Collecting Empirical Data

Raw empirical data is gathered for the document collection or web site from usage records or access logs of the web locality or by direct traversal of the Web pages in the document collection or Web site. "Agents" may be used to collect such raw data. However, it should be noted that the described agents are not the only possible method for obtaining the raw data. It is anticipated that Internet service providers have the capabilities to provide such raw data and may do so in the future. Sources for such empirical data include website access logs (e.g., the Xerox Web site), proxy access logs (e.g., all the AOL users go through proxy/gateway servers), client applications (e.g. see Alexa Internet http://www.alexa.com), and redirects from search results (e.g. see Direct Hit httg://www.directhit.com/).

The collected empirical data as used in the present invention will span a particular time frame (e.g. a day, week or month). However, the data actually used for the analysis may be limited to some particular time period of interest, e.g. operation Monday through Friday. This may be useful if it is desirable to order search results based on predicted access patterns of a document collection during the week versus the weekends.

Initializing Initial Activation Pattern

As described above, the initial activation pattern is a focus set of web pages corresponding to the actual, hypothetical, or predicted initial information interests of one or more users. Preferably, it is represented as a matrix wherein the entries indicate the expected number of users that will start at each page in the document collection, i.e. web site. In the currently preferred embodiment, the initial activation patterns represent the search results. Thus, the initial activation matrix will only have entries at the corresponding locations where documents exist. Note that another suitable method for initializing the initial activation matrix is to estimate "popularity" based on the number of in-links to a page.

Performing and obtaining the search results may be performed by any of a number of well-known techniques. As described above, various search engines for performing searches on the Web are available. The present invention may be utilized with any of the underlying search and retrieval techniques of the aforementioned systems.

Initializing Matrix of Page to Page Transitions

The matrix of page to page transitions represents, based on the empirical data, an estimate of the actual traversal of users in the document collection. In other words it is representation of the document collection as a usage-based network. Such creation of a usage-based network is described in co-pending application Ser. No. 08/831,807, which is assigned to the same assignee as the present application.

The Law of Surfing

Through extensive empirical studies using different user communities several strong regularities of Web user surfing patterns have been discovered. These regularities can be described by a law of surfing, derived below, which determines the probability distribution of the number of pages a user visits within a Web site. In conjunction with a spreading activation algorithm, the law can be used to simulate the surfing patterns of users on a given Web site. This leads to accurate predictions of page hits.

The law of surfing is defined by a probability P(L) indicating the number of links L that a user follows in a Web site. P(L) is derived by considering that there is value in each page a user visits, and that clicking on the next page assumes that it will be valuable as well. Since the value of the next page is not certain, one can assume that it is stochastically related to the previous one. In other words, the value of the current page is the value of the previous one plus or minus a random term. Thus, the page values can be written as $$V_L = V_{L-1} + \epsilon_L \qquad (1)$$

where the values $\epsilon_L$ are independent and identically distributed Gaussian random variables. Notice that a particular sequence of page valuations is a realization of a random process and so is different for each user. Within this formulation, an individual will continue to surf until the expected cost of continuing is perceived to be larger than the discounted expected value of the information to be found in the future. This can be thought of as a real option in financial economics, for which it is well known that there is a threshold value for exercising the option to continue. Note that even if the value of the current page is negative, it may be worthwhile to proceed, since a collection of high value pages may still be found. If the value is sufficiently negative, however, then it is no longer worth the risk to continue. That is, when $V_L$ falls below some threshold value, it is optimal to stop.

The number of links a user follows before the page value first reaches the stopping threshold is a random variable L. For the random walk of Eq. 1 it has been determined that the probability distribution of first passage times to a threshold is given asymptotically by the two-parameter inverse Gaussian distribution:

$$P(L) = \sqrt{\frac{\lambda}{2\pi L^3}} \exp\left(\frac{-\lambda(L-\mu)^2}{2\mu^2 L}\right) \qquad (2)$$

with mean $E[L] = \mu$ and variance $Var[L] = \mu^3/\lambda$.

The $\lambda$ and $\mu$ are estimated by estimating an Inverse Gaussian Distribution (IVGD) that fits the distribution of surfing paths for a Web collection. The IVGD fitting is done by estimating the $\mu$ and $\lambda$ parameters, using some standard known statistical technique like the Method of Moments, least-squares fitting, bayesian conjugate priors, etc. In the currently preferred embodiment, the method of moments is used. The parameters come from empirical data obtained by plotting the number of people surfing at a given depth (or clicks) and then using Eqs 2 or 4 to derive the distribution and the parameters.

Figure 2:
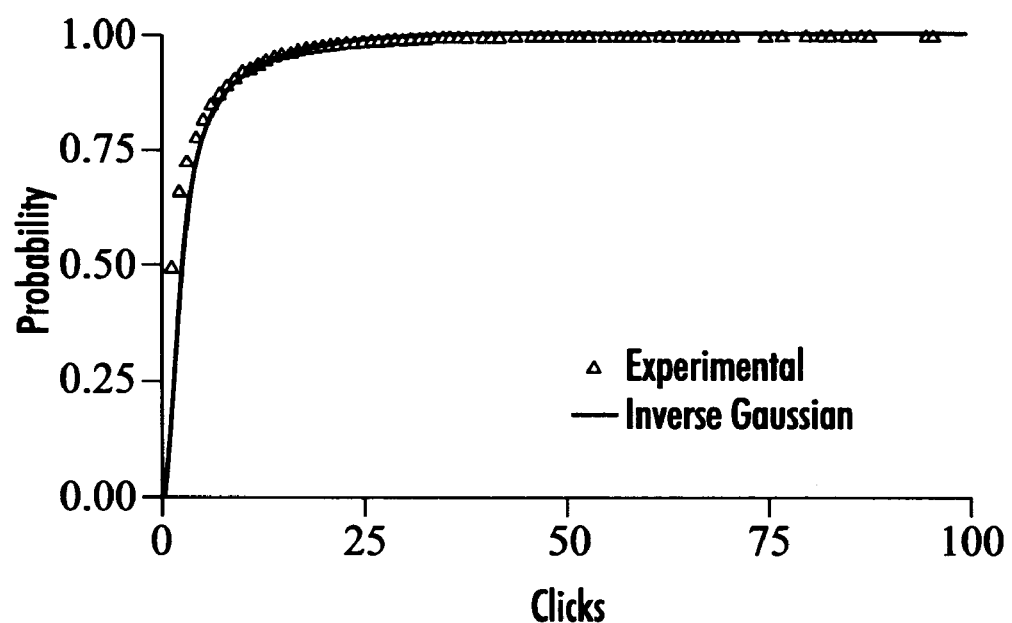
FIG. 2 is an illustration of an Inverse Gaussian Distribution indicative of user traversal patterns as found in the currently preferred embodiment of the present invention.

An example of an Inverse Gaussian Distribution characteristic of the law of surfing is illustrated in FIG. 2. This distribution has two characteristics worth stressing in the context of user surfing patterns. First, it has a very long tail, which extends much further than that of a normal distribution with comparable mean and variance. This implies a finite probability for events that would be unlikely if described by a normal distribution. Consequently, large deviations from the average number of user clicks computed at a site will be observed. Second, because of the asymmetry of the distribution function, the typical behavior of users will not be the same as their average behavior. Thus, since the mode is lower than the mean, care has to be exercised with available data on the average number of clicks, as it overestimates the typical depth being surfed.

Having determined that Eq. 2 is a good description of user surfing patterns, it is shown how in conjunction with spreading activation, it can predict the number of hits for each page in a Web site, a quantity of interest in electronic commerce. Spreading activation refers to a class of techniques that propagate numerical values (or activation levels) among the connected nodes of a graph. Their application ranges from models of human memory and semantics, to information retrieval. In the context of the Web, the nodes correspond to pages and the arcs to the hyperlinks among them, so that spreading activation simulates the flow of users through a Web site. Spreading activation is described briefly as follows and in greater detail below.

Consider a collection of n Web pages, each indexed by i=1, 2, . . . , n, and connected by edges to form a graph. One can simulate the surfing activity of users by assigning a weight, $S_{j,i}$, between the $i^{th}$ and $j^{th}$ node. This weight can be interpreted as the fraction of continuing users at node i who proceed to node j if $$\sum_j S_{j,i} = 1,$$

where the sum is over all the nodes to node i by an edge. Let $f_L$ be the fraction of users who, having surfed along L-1 links, continue to surf to depth L. Defining the activation value $N_{i,L}$ as the number of users who are at node i after surfing through L clicks, one obtains $$N_{i,L+1} = f_L \sum_k S_{i,k} N_{k,L} \qquad (3)$$

Note that eq. 3 is a definition of the spreading activation that is used in the currently preferred embodiment of the present invention. In any event, the fraction $f_L$ is found from Eq. 2 by noting that in a group of users it is equal to the ratio of the number of users who surf for L or more links to the number who surf for L-1 or more links. In terms of $F(L,\mu,\lambda)$, the CDF of the inverse Gaussian, it is given by $$f_L = \frac{1 - F(L, \mu, \lambda)}{1 - F(L-1, \mu, \lambda)} \qquad (4)$$

With this definition, Eq. 4 can be iterated from initial conditions $N_{i,1}$. After most of the surfers have stopped, the predicted aggregate number of hits at each page is simply the sum over all iterations for each page.

Spreading Activation

Spreading activation can be characterized as a process that identifies knowledge predicted to be relevant to some focus of attention. As described by P. Pirolli, J. Pitkow and R. Rao in the publication entitled *Silk from a Sow's Ear: Extracting Usable Structures from the Web*, Conference on Human Factors in Computing Systems (CHI 96), Vancouver British Columbia, Canada, April 1996, spreading activation has been applied to the Web as a technique that can be used to make predictions as to pages relevant to a particular set of source pages. When used in connection with the law of surfing, other interesting sets of information may be derived, such as a prediction of the number of hits on particular pages of a Web site.

A decay function is a critical analytical component of the spreading activation used in the present invention. As noted above, the law of surfing is used to generate decay values for dampening activation through a network. Depending on the nature of the decay function, activation values are assumed to be the predicted relevance to the input focus (or the probability that a page will be needed given the pages in the input focus).

The particular technique described has the property that the activation patterns that result from multiple input sources are just additive combinations of the activation patterns produced by each of the sources individually (multiple weighted sources are just weighted additions of the individual sources). Using this property, one may precompute the activation patterns that arise from each source combined with each graph. All complex patterns can be derived from these by simple vector addition. As described in co-pending application Ser. No. 08/831,807, and can be used to answer a number of interesting questions, such as assessing the typical web author at a web site or predicting the interest of home page visitors.

Networks for Spreading Activation

As outlined above, the network is used to represent strength of associations among Web pages as reflected by user surfing patterns through a web site. The network or graph is represented by matrices in the spreading activation equation. That is, each row corresponds to a network node representing a Web page, and similarly each column corresponds to a network node representing a Web page. If we index the 1, 2, . . . , N Web pages, there would be i=1, 2, . . . Ncolumns and j=1, 2, . . . N rows for each matrix representing a graph network.

Each entry in the $i^{th}$ column and $j^{th}$ row of a matrix represents the strength of connection between page i and page j (or similarly, the amount of potential activation flow or capacity). The meaning of these entries varies depending on the type of network through which activation is being spread. In the currently preferred embodiment, the entry values represent actual measured transitions between pages.

Figure 3:
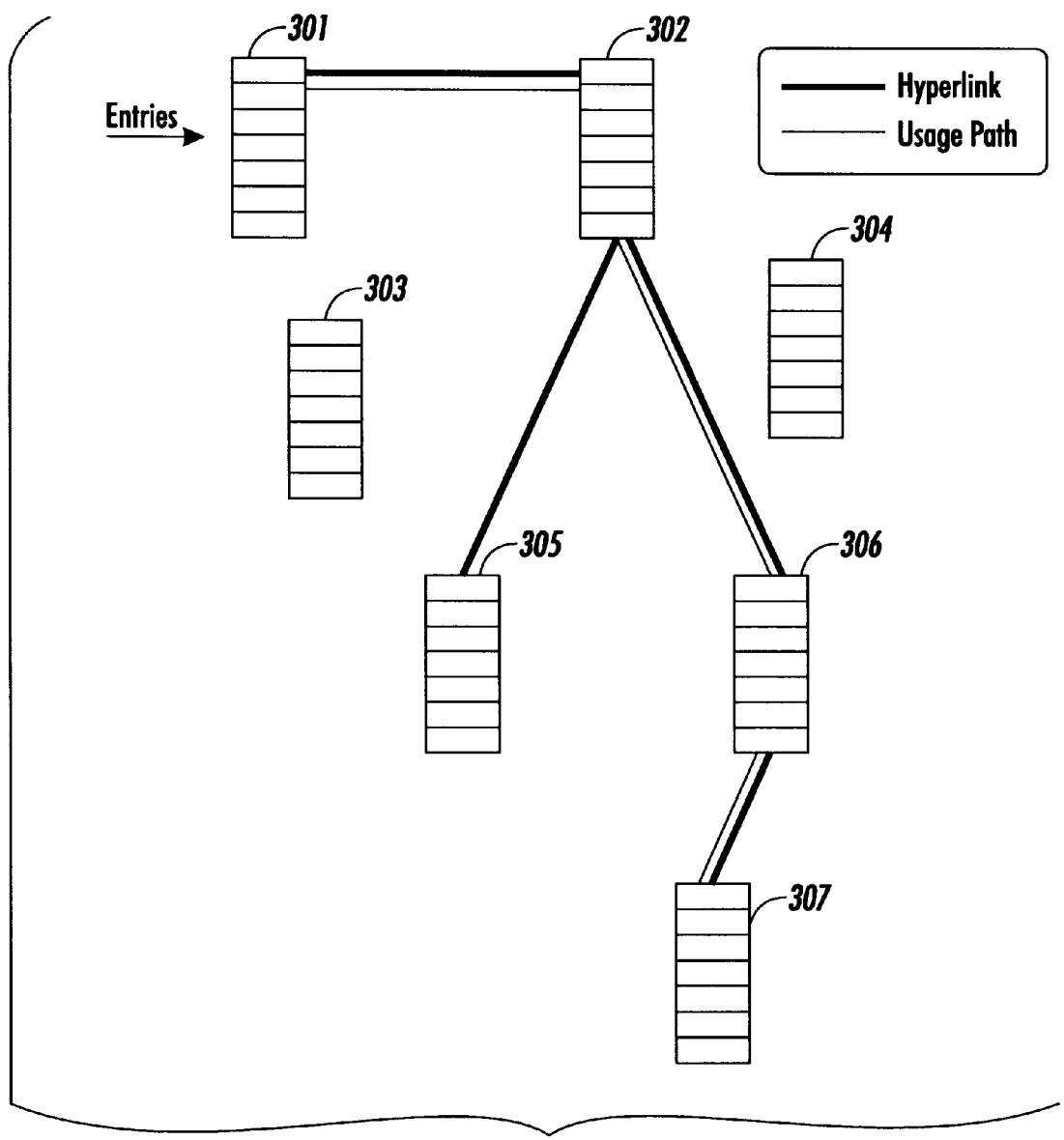

FIGS. 3–4 illustrate a network and corresponding matrix representation. Referring to FIG. 3, it should be noted that there will only be surfing between nodes where there are corresponding links. So illustrated on FIG. 3 are both links and the strength of the surfing path. Referring now to FIG. 4, for the matrix representation of surfing network an entry of an integer strength, s>=0, in column i row j, indicates the probability of a user surfing from page i to page j.

The Result of Spreading Activation

Figure 5:
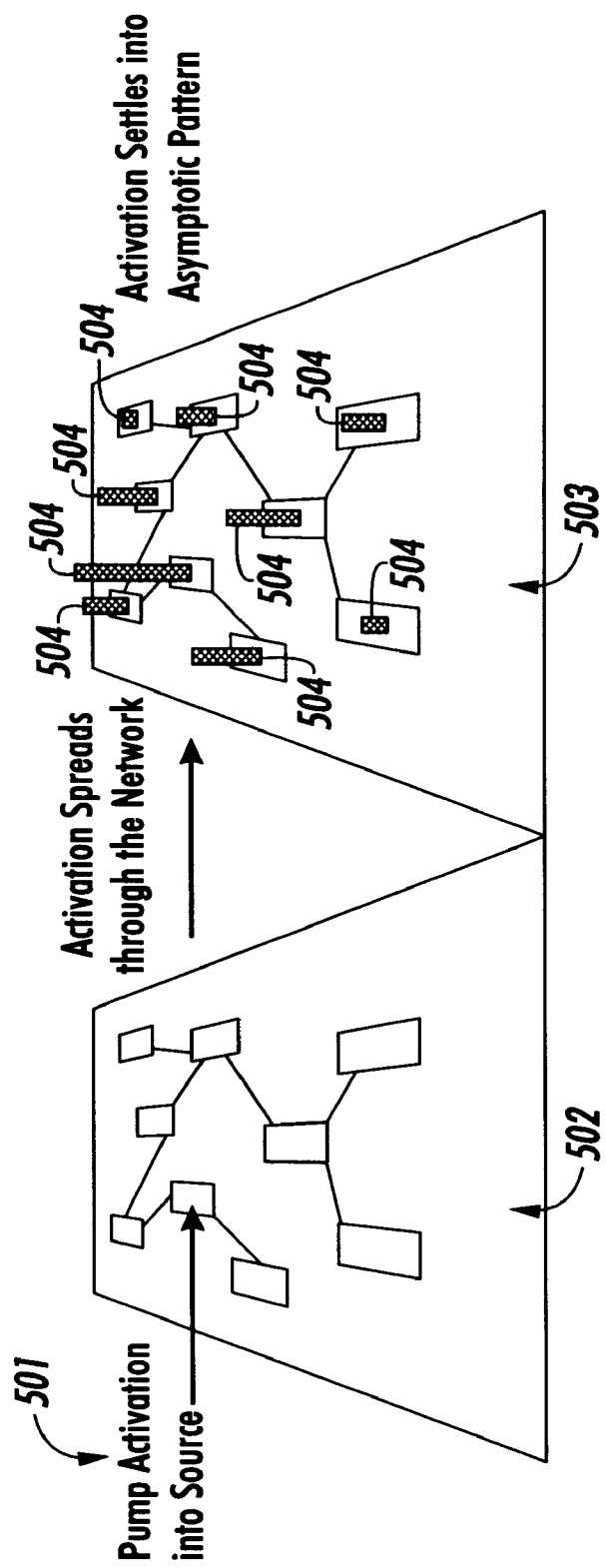
FIG. 5 is a diagram illustrating spreading activation and the result thereof to find activation levels for the documents in the set of documents of a search result as may be performed in the currently preferred embodiment of the present invention.

Spreading activation across a network and finding related pages is described conceptually with reference to FIG. 5. Referring to FIG. 5, activation 501 is pumped into one or more of the graph networks 502 at nodes representing some starting set of focus Web pages. The activation flows through the arcs of the graph structure, with the amount of flow modulated by the arc strengths (which might also be thought of as arc flow capacities) and dampened by the probability values provided by the law of surfing. The asymptotic pattern of activation over nodes, as illustrated by bars 504 contained in the nodes at activated network 503, will define a number of hits of other Web pages relative to the starting set of focus Web pages.

Figure 6:
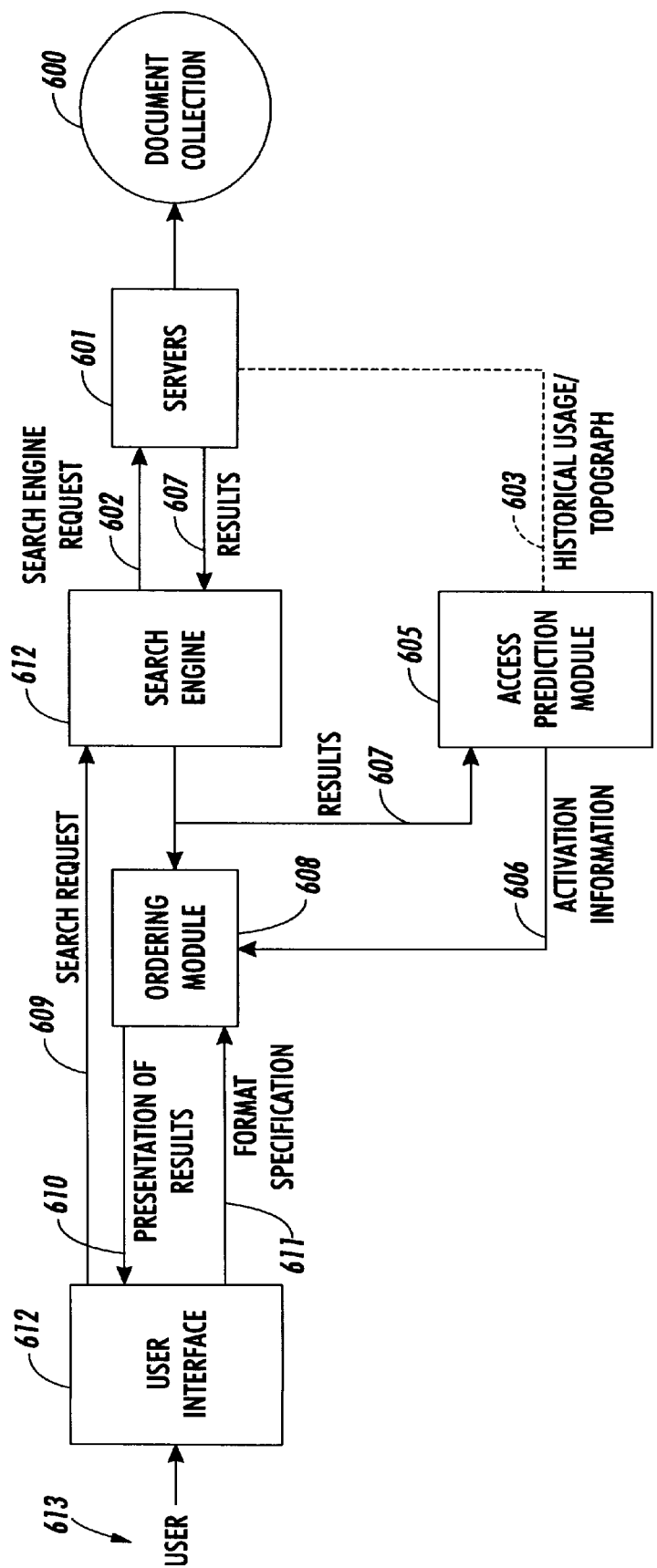
FIG. 6 is a block diagram illustrating the basic functional components of the currently preferred embodiment of the present invention.

Block Diagram of the Functional Components of the Currently Preferred Embodiment FIG. 6 is a block diagram of the functional components of the currently preferred embodiment of the present invention. Referring to FIG. 6, a document collection 600 is accessible by one or more servers 601. The document collection may conceptually be thought of as the Web, or may be a local web site. The servers 601 control access to the documents contained in the document collection. A user 613, operating through user interface 612 initiates a user search request 609 to search engine 604. The search engine 604 may then translate the user request into one or more search engine search requests 602 to one or more of said servers 601. This translation may be necessary because each of the servers may have their own search query syntax.

Concurrently, the user may provide an ordering module 608 with a format specification 611. This format specification will provide an indication of how the search results should be ordered for presentation to the user. Access prediction module 605 will be coupled to obtain historical usage data and topography data 603 from server (s) 601. This coupling may happen in many ways. For example, a specific request to view server access logs or by an Agent traversing through the document collection. In any event, from the historical usage data and topography data the page to page transition matrix and probability function are derived.

After the search is completed, the search results 607 are provided both to the access prediction module 605 and the ordering module 608. Note that the search results may include an ordering based on features provided by the search engine 604. These ordering features may be used in combination with those provided by the present invention. The search results 607 will be used in the access prediction module to create the aforementioned initial activation matrix. The Access prediction module 605 performs a spreading activation operation on the initial activation matrix, page to page transition matrix and probability function to obtain activation information 606 relative to the search results. The activation information 606 is then provided to the ordering module 608. Based on the format specification 611, the user interface 612 will present an ordered list of the search results.

It should be noted that while FIG. 6 shows the functional components as discrete blocks, much of the functionality can be integrated into fewer units. For example, the user interface 612, ordering module 608, access prediction module 605 and search engine 604 may be implemented as a single application running on a computer system. Other integrated combinations of the functional components would not cause departure of the spirit and scope of the present invention.

FIG. 7 illustrates a user interface for displaying search results that may be used by the currently preferred embodiment of the present invention. A first area 701 provides a listing of the results of the document search. This listing may include the document titles 702, a document summary 703, a URL link for obtaining the document 704 and an indicator of the activation level 705. The activation level 706 would provide the user an indication of how the document was ordered. A second area 707 provides controls for scrolling through the search results 708 as well as specifying how the documents are to be ordered 709. It should be noted that the user interface for the search results in the currently preferred embodiment could be similar to those found in commercially available search engines.

Figure 8:
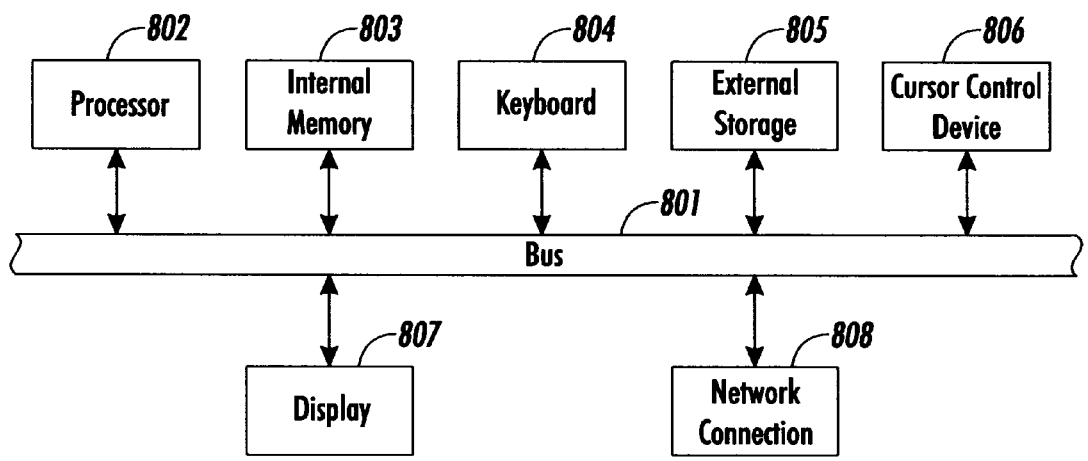
FIG. 8 is a block diagram of a computer-based system as may be utilized to implement the currently preferred embodiment of the present invention.

Overview of a Computer Controlled Display System in the Currently Preferred Embodiment of the Present Invention The computer based system on which the currently preferred embodiment of the present invention may be implemented is described with reference to FIG. 8. The computer based system and associated operating instructions (e.g. software) embody circuitry used to implement the present invention. Referring to FIG. 8, the computer based system is comprised of a plurality of components coupled via a bus 801. The bus 801 may consist of a plurality of parallel buses (e.g. address, data and status buses) as well as a hierarchy of buses (e.g. a processor bus, a local bus and an I/O bus). In any event, the computer system is further comprised of a processor 802 for executing instructions provided via bus 801 from Internal memory 803 (note that the Internal memory 803 is typically a combination of Random Access and Read Only Memories). The processor 802 will be used to perform various operations in support extracting raw data from web localities, converting the raw data into the desired feature vectors and topology, usage path and text similarity matrices, categorization and spreading activation. Instructions for performing such operations are retrieved from Internal memory 803. Such operations that would be performed by the processor 802 would include the processing steps described in FIG. 1. The operations would typically be provided in the form of coded instructions in a suitable programming language using well-known programming techniques. The processor 802 and Internal memory 803 may be discrete components or a single integrated device such as an Application Specification Integrated Circuit (ASIC) chip.

Also coupled to the bus 801 are a keyboard 804 for entering alphanumeric input, external storage 805 for storing data, a cursor control device 806 for manipulating a cursor, a display 807 for displaying visual output (e.g. the WebBook) and a network connection 808. The keyboard 804 would typically be a standard QWERTY keyboard but may also be telephone like keypad. The external storage 805 may be fixed or removable magnetic or optical disk drive. The cursor control device 806, e.g. a mouse or trackball, will typically have a button or switch associated with it to which the performance of certain functions can be programmed. The network connection 808 provides means for attaching to a network, e.g. a Local Area Network (LAN) card or modem card with appropriate software. The network ultimately attached to is the Internet, but it may be through intermediary networks or On-Line services such as America On-Line, Prodigy™ or CompuServe™.

Thus, a system for providing an ordering of the results of a search on a document collection is disclosed. While the present invention is described with respect to a preferred embodiment, it would be apparent to one skilled in the art to practice the present invention with other configurations of digital document management systems. Such alternate embodiments would not cause departure from the spirit and scope of the present invention.

What is claimed is:

1. A method for ranking the results of a search on a collection of linked documents, said method comprising the steps of:
    a) generating historical information for said collection of linked documents, its links, access and traversal patterns through said collection of linked documents;
    b) providing said search results as initial activation information, said initial activation information indicating a set of focus documents for said collection of linked documents;

c) performing a spreading activation operation based on said initial activation information and said historical information and based on a network representation of said collection of linked documents;

c) extracting activation information resulting from said spreading activation operation step when a stable pattern of activation across all nodes of said network representation of said collection of linked documents is reached; and d) ranking said search results based on said activation information, said ranking based on the level of activation achieved by documents in said search results.

2. The method as recited in claim 1 wherein said step of generating historical information for said collection of linked documents, its links, access and traversal patterns through said collection of linked documents is further comprised of the steps of:

a1) gathering usage data for said collection of linked documents;

a2) generating page to page transition information from said usage data, said page to page transition information indicating a strength of association between documents in said collection of linked documents; and a3) generating link probability information from said usage data, said link probability information indicating a distribution of the number of documents a user will access in said collection of linked documents.

3. The method as recited in claim 2 further comprising the step of: e) presenting said ordered search results to a user wherein documents having a higher level of activation are in a higher order position.

4. A system for providing a ranking for a set of documents representing search results from a collection of linked documents comprising:

means for generating historical information of the usage of said collection of linked documents;

means for defining said set of documents as initial activation information, said initial activation information indicating a set of focus documents for said collection of linked documents;

spreading activation means for performing a spreading activation operation based on said initial activation information and historical information based on a network representation of said collection of linked documents, said spreading operation performed to obtain activation information from said set of documents; and means for ranking said set of documents based on said activation information for said set of documents.

5. The system as recited in claim 4 wherein said means for generating historical information regarding the usage of said collection of linked documents is further comprised of:

means for gathering usage data for said collection of linked documents;

means for generating page to page transition information from said usage data, said page to page transition information indicating a strength of association between documents in said collection of linked documents; and means for generating link probability information from said usage data, said link probability information indicating a distribution of the number of documents a user will access in said collection of linked documents.

6. The system as recited in claim 5 wherein said spreading activation means is further comprised of activation means for causing simulated access of documents through said network representations of said collection of linked documents; and extraction means for extracting activation information resulting when a stable pattern of activation across all nodes of said network representation of said collection of linked documents is reached.

7. A system for submitting search requests to collections of linked documents and obtaining results ordered based on historical usage comprising:

a user interface for submitting search requests and viewing search results;

a search engine for processing search requests, said search engine coupled to a server for accessing said collection of linked documents;

an access prediction module coupled to said search engine to receive said search results, said access prediction module further coupled to obtain historical usage and topography data for said collection of linked documents, said access prediction module for generating activation information for said search results;

an ordering module coupled to said access prediction module, said search engine and said user interface, said ordering module for presenting an ordering of said search results based on said activation information.

8. The system as recited in claim 7 wherein said access prediction module is further comprised of:

circuitry for gathering historical usage and topology data for said collection of linked documents;

circuitry for generating an initial activation matrix from said search results;

circuitry for generating page to page transition information from said historical usage and topology data, said page to page transition information indicating a strength of association between documents in said collection of linked documents;

circuitry for generating link probability information from said historical usage and topology data, said link probability information indicating a distribution of the number of documents a user will access in said collection of linked documents; and circuitry for performing a spreading activation operation using said initial activation matrix, page to page transition information and said link probability information to obtain activation information.

9. The system as recited in claim 8 wherein said ordering module is further comprised of circuitry for identifying activation information for each document in said search result and circuitry for presenting said search results in an order based on the activation information for each document in said search results.

* * * * *

UNITED STATES PATENT AND TRADEMARK OFFICE
CERTIFICATE OF CORRECTION

| | | |
|---|---|---|
| PATENT NO. | : 6,272,507 B1 | Page 1 of 1 |
| APPLICATION NO. | : 09/163595 | |
| DATED | : August 7, 2001 | |
| INVENTOR(S) | : Peter L Pirolli et al. | |

It is certified that error appears in the above-identified patent and that said Letters Patent is hereby corrected as shown below:

Column 1, line 10, insert as a new paragraph:

This invention was made with Government support under N00014-96-C-0097 awarded by ONR. The Government has certain rights in this invention.

Signed and Sealed this

Eleventh Day of March, 2008

JON W. DUDAS
*Director of the United States Patent and Trademark Office*